United States Patent
Dunham et al.

(10) Patent No.: US 10,773,651 B2
(45) Date of Patent: Sep. 15, 2020

(54) CONVERTIBLE THERMAL CONTAINER FOR A VEHICLE STORAGE AREA

(71) Applicant: Ford Global Technologies, LLC, Dearborn, MI (US)

(72) Inventors: Scott Holmes Dunham, Redford, MI (US); Kiesou David Hong, Sterling Heights, MI (US); Patrick Kennedy Berryman, Dearborn, MI (US); Jane Maria Aselage, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 15/641,642

(22) Filed: Jul. 5, 2017

(65) Prior Publication Data
US 2019/0009727 A1 Jan. 10, 2019

(51) Int. Cl.
*B60R 5/04* (2006.01)
*B65D 81/38* (2006.01)

(52) U.S. Cl.
CPC .............. *B60R 5/047* (2013.01); *B60R 5/045* (2013.01); *B65D 81/38* (2013.01)

(58) Field of Classification Search
CPC .......... B60R 5/047; B60R 5/045; B60D 81/38
See application file for complete search history.

(56) References Cited

U.S. PATENT DOCUMENTS

| | | | |
|---|---|---|---|
| 5,685,592 A * | 11/1997 | Heinz | B60N 3/10 224/925 |
| 6,508,502 B2 | 1/2003 | Willard | |
| 6,821,600 B1 | 11/2004 | Henson | |
| 6,929,303 B1 | 8/2005 | Sharples | |
| 7,028,872 B2 * | 4/2006 | Lobanoff | B60R 5/047 211/123 |
| 7,318,617 B1 | 1/2008 | Scotton | |
| 7,758,092 B2 | 7/2010 | Kolpasky et al. | |
| 7,806,453 B2 | 10/2010 | Aebker | |
| 8,414,049 B2 | 4/2013 | Parker | |
| 9,452,716 B2 | 9/2016 | Williams et al. | |
| 10,029,618 B2 * | 7/2018 | Perez Astudillo | B60R 5/048 |
| 2004/0020956 A1 * | 2/2004 | Lobanoff | B60R 5/047 224/497 |
| 2009/0072567 A1 * | 3/2009 | Bohlke | B60R 5/045 296/37.5 |
| 2016/0288720 A1 * | 10/2016 | Huebner | B60R 5/045 |
| 2016/0325686 A1 * | 11/2016 | Krishnan | B60R 5/047 |

FOREIGN PATENT DOCUMENTS

| | | | | |
|---|---|---|---|---|
| DE | 10007137 A1 * | 8/2000 | | B60R 5/045 |
| DE | 102010046635 A1 * | 3/2012 | | B60R 7/02 |
| EP | 1382490 A1 * | 1/2004 | | B60R 5/044 |
| EP | 2620327 A1 * | 7/2013 | | B60R 5/045 |
| JP | 2006062485 A * | 3/2006 | | |
| WO | 2012132364 | 10/2012 | | |

* cited by examiner

*Primary Examiner* — Daniel J Troy
*Assistant Examiner* — Ryan A Doyle
(74) *Attorney, Agent, or Firm* — David Coppiellie; Price Heneveld LLP

(57) ABSTRACT

A tonneau cover for a vehicle storage area includes a retractable screen that extends from a housing to define extended and retracted positions. A handle assembly is coupled to an outer edge of the retractable screen and has an expandable base that defines a collapsed position proximate the retractable screen and an expanded position that defines a storage volume.

19 Claims, 14 Drawing Sheets

CONVERTIBLE THERMAL CONTAINER FOR A VEHICLE STORAGE AREA

FIELD OF THE INVENTION

The present invention generally relates to storage compartments for vehicles, and more specifically, a convertible thermal container that can be disposed within a cargo area of a vehicle.

BACKGROUND OF THE INVENTION

Within various vehicles, storage areas can include concealing features that hide various cargo areas from view. Such concealing features can include tonneau covers, operable load floors, and various other panels and compartment lids. In the case of a tonneau cover, a flexible screen is extendible and retractable into a housing for covering a rear cargo area of a vehicle. The tonneau cover can be used to conceal cargo located within a rear compartment of a vehicle for security and aesthetic reasons.

SUMMARY OF THE INVENTION

According to one aspect of the present invention, a tonneau cover for a vehicle storage area includes a retractable screen that extends from a housing to define extended and retracted positions. A handle assembly is coupled to an outer edge of the retractable screen and has an expandable base that defines a collapsed position proximate the retractable screen and an expanded position that defines a storage volume.

Embodiments of this aspect of the invention can include any one or combination of the following features:
  the handle assembly includes a screen portion that is coupled to the retractable screen, and wherein the expandable base is selectively removable from the screen portion
  the expandable base includes a thermally insulating layer that surrounds the storage volume
  the screen portion of the handle assembly includes a retaining structure that is adapted to be received within a cover receptacle defined within an interior panel of a vehicle to define the extended position
  the retractable screen is biased toward the retracted position by a rotational biasing mechanism located within the housing
  the expandable base includes an operable flap that is operable between open and closed positions to provide selective access to the storage volume
  the operable flap is defined within a container portion of the handle assembly According to another aspect of the present invention, a vehicle includes a rear storage area defining a cover receptacle. A retractable screen is selectively coupled to the cover receptacle to define a covering state of the rear storage area. A handle assembly is coupled to the retractable screen and having an expandable container that is selectively removable from the retractable screen.

Embodiments of this aspect of the invention can include any one or combination of the following features:
  the handle assembly includes a retaining structure that selectively engages the cover receptacle to define the covering state, and wherein the expandable container is operable between expanded and collapsed positions, the expanded position defining an interior storage volume
  the expandable container is selectively removable from a screen portion of the handle assembly
  wherein the retaining structure is defined within the screen portion
  the handle assembly includes a container portion that defines the expandable container,
  wherein the container portion includes an operable flap that is operable to provide selective access to the interior storage volume of the expandable container
  the expandable container includes a progressively operable expansion device,
  wherein the expansion device is selectively operable to define a collapsed position, an expanded position and a plurality of partially-expanded positions of the expandable container
  the expandable container in the expanded position defines a front wall that is selectively operable to provide access to the interior storage volume.
  the expandable container includes a thermally insulating layer that surrounds the interior storage volume
  the expandable container includes a base that extends away from the container portion of the handle assembly to define the expanded position
  wherein the base includes a fastener that selectively engages a sidewall of the rear storage area to retain the expandable container in the expanded position when the container portion is coupled to the screen portion
  the fastener selectively engages the container portion of the handle assembly in the collapsed position to selectively retain the base in the collapsed position According to another aspect of the present invention, a vehicle tonneau cover includes a retractable screen that is selectively extendable from a housing. A handle assembly has a screen portion attached to the retractable screen and a container portion that is selectively removable from the screen portion. An insulated container is attached to the container portion and is operable between a collapsed position and an extended position that defines an interior storage volume.

Embodiments of this aspect of the invention can include any one or combination of the following features:
  the screen portion of the handle assembly includes a retaining structure that couples with a cover receptacle of a rear storage area of a vehicle, and wherein the insulated container is selectively removable from the screen portion while the screen portion is held in the cover receptacle
  the container portion of the handle assembly includes a rotationally operable handle that is operable between stowed and use positions
  wherein the handle in the stowed position activates a latch mechanism that selectively couples with the screen portion, and wherein operation of the handle to the use position deactivates the latch mechanism
  the container portion is adapted to at least partially occupy the cover receptacle when the container portion is attached to the screen portion and the handle assembly is retained within the cover receptacle According to another aspect of the present invention, a tonneau cover for a vehicle storage area includes a retractable screen that extends from a housing to define extended and retracted positions. A handle assembly is coupled to an outer edge of the retractable screen and has a fabric stowing area. A collapsible fabric member is operable to a folded position defined by the fabric member selectively disposed within the fabric stowing area, wherein the fabric member is alternatively operable to an unfurled position wherein the fabric member defines a collapsible container that can be positioned below the retractable screen.

Embodiments of this aspect of the invention can include any one or combination of the following features:
- the collapsible fabric member includes a plurality of straps that are adapted to engage corresponding attachment features defined within a portion of a rear cargo area of a vehicle to define a container position
- the plurality of straps are defined by fabric loops that extend from an upper edge of the collapsible container
- the retractable fabric screen defines an operable lid of the collapsible fabric member in the container position
- the collapsible fabric member includes a thermally insulating member
- the handle assembly includes upper and lower members that are rotationally operable to define the fabric stowing area that selectively receives the collapsible fabric member in the folded position
- the upper and lower members define a clamshell mechanism
- one of the upper and lower members includes a retaining structure for selectively engaging a cover receptacle to define the extended position of the retractable screen
- the collapsible fabric member defines a thermally insulated container
- the thermally insulated container is substantially free of structural reinforcement According to another aspect of the present invention, a convertible load floor for a vehicle cargo area includes a lower member, an operable upper member having a handle portion and a hinge portion. The hinge portion hingedly engages the lower member at a hinge. The operable upper member is operable between a folded position and a container position. A plurality of folding flaps are disposed between the upper member and the lower member. The folding flaps further define the folded position and the container position. The container position is defined by the hinge member, the folding flaps and the lower member forming a storage container and the handle member defining a lid of the storage container.

Embodiments of this aspect of the invention can include any one or combination of the following features:
- the folding flaps are hingedly coupled with the lower member
- the folding flaps include opposing lateral flaps and a central flap
- the folding flaps are each substantially rigid members that are coupled together in the container position by retaining tabs that engage corresponding retaining recesses
- the folding flaps are connected together via living hinges
- the lower member, the operable upper member and the plurality of folding flaps each include a thermally insulating layer
- the handle portion is selectively coupled to a top edge of the folding flaps to define an enclosed state of the storage container
- the lower member defines a floor of a rear cargo area of the vehicle These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
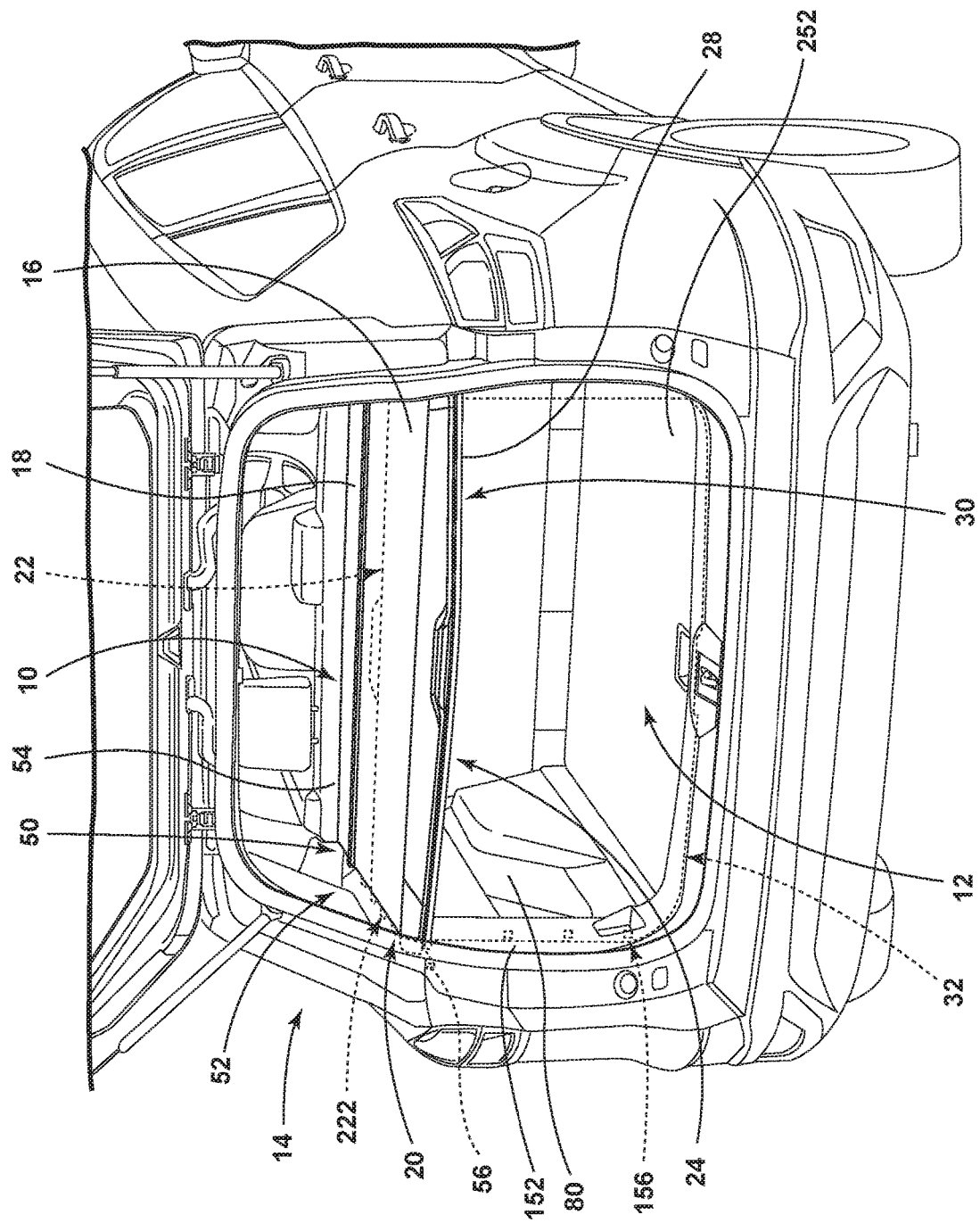
FIG. 1 is a rear perspective view of a vehicle showing an aspect of a convertible tonneau cover installed within a rear cargo area.
Figure 2:
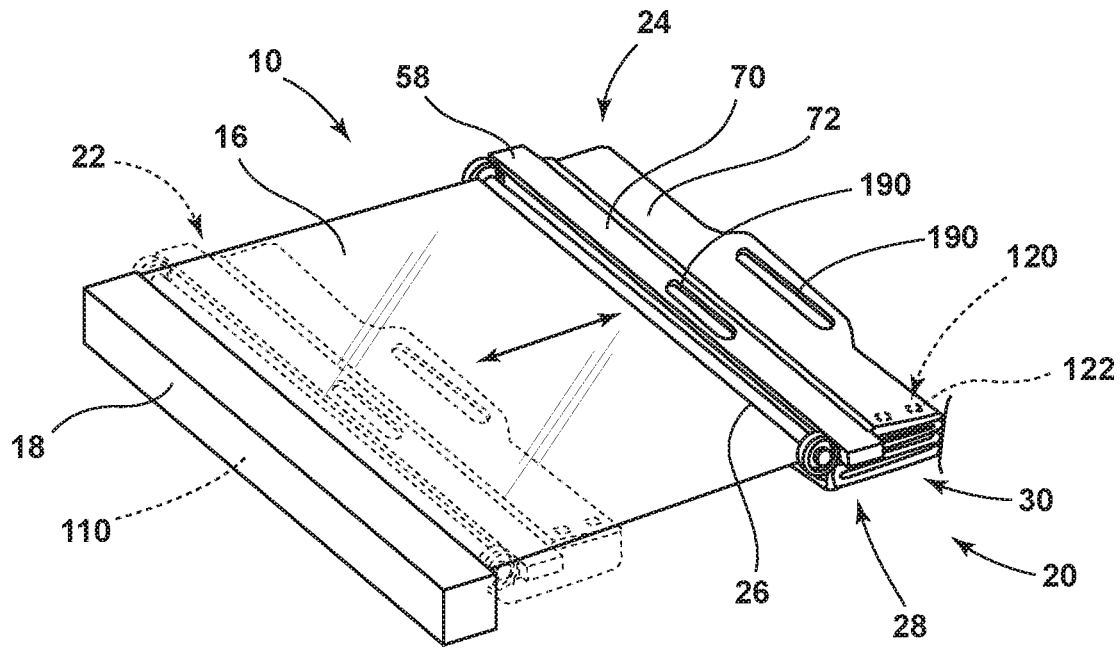
FIG. 2 is a top perspective view of a tonneau cover shown in an extended position and incorporating an aspect of an expandable container shown in a collapsed position.
Figure 3:
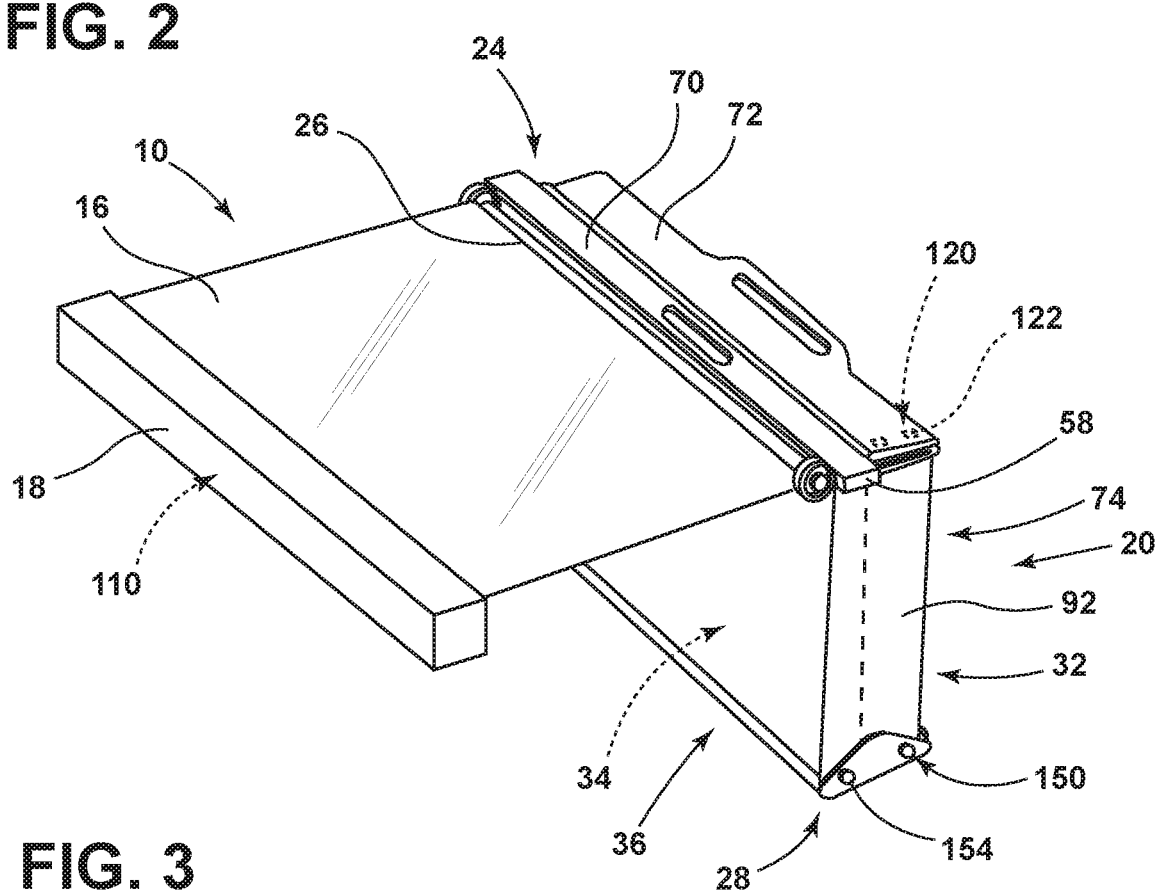
FIG. 3 is a top perspective view of the tonneau cover of FIG. 2, showing the expandable container in an expanded position.
Figure 4:
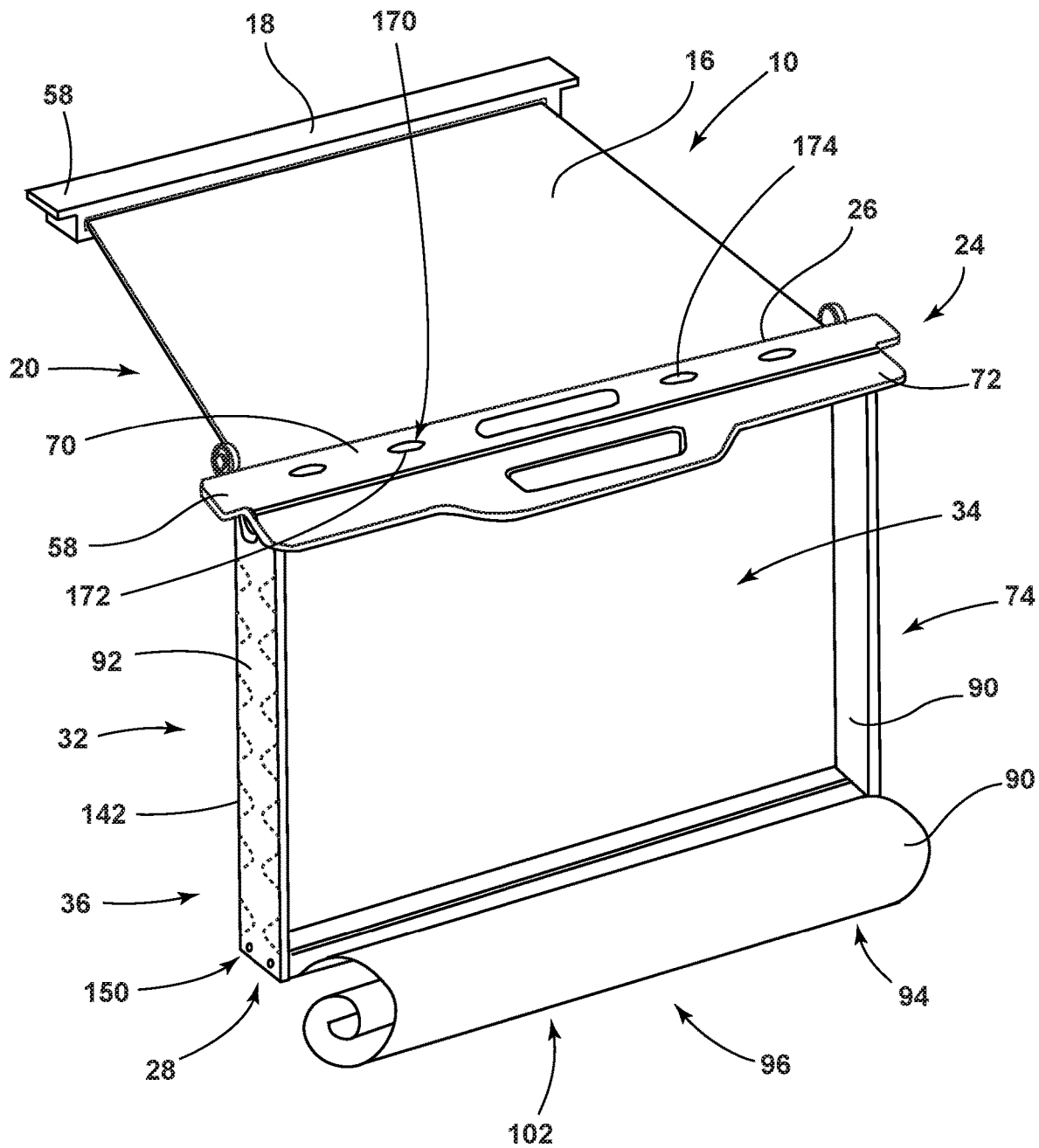
FIG. 4 is a top perspective view of a tonneau cover incorporating an aspect of the expandable container and showing an operable front panel in an open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-10, reference numeral 10 generally refers to a tonneau cover that can be disposed within a rear cargo area 12 of a vehicle 14 for concealing various cargo that is disposed within the rear cargo area 12. According to various aspects of the device, the tonneau cover 10 can include a retractable screen 16 that extends from a housing 18 to define extended and retracted positions 20, 22 of the retractable screen 16. The tonneau cover 10 also includes a handle assembly 24 that is coupled to an outer edge 26 of the retractable screen 16. The handle assembly 24 includes an expandable base 28 that defines a collapsed position 30 proximate the retractable screen 16. The expandable base 28 can be moved to an expanded position 32 that defines a storage volume 34 for an expandable container 36.

Referring again to FIGS. 1-10, the rear cargo area 12 of a vehicle 14 can define a cover receptacle 50 for receiving the tonneau cover 10. The retractable screen 16 is selectively coupled to the cover receptacle 50 in the extended position 20 to define a covering state 52 of the rear cargo area 12. In the covering state 52 of the rear cargo area 12, the housing 18 is disposed within a portion of the cover receptacle 50 proximate a seat 54 of the vehicle 14, typically a rear seat 54. A retractable screen 16 can then be extended to an outer portion 56 of the cover receptacle 50, such that a retaining structure 58 of the handle assembly 24 can be placed within the outer portion 56 of the cover receptacle 50 for defining the extended position 20 of the retractable screen 16.

According to various aspects of the device, as exemplified in FIGS. 1-10, the handle assembly 24 is coupled to the retractable screen 16 and includes the expandable container 36 that is selectively removable from the retractable screen 16. In various aspects of the device, the handle assembly 24 can include a screen portion 70 that is coupled to the outer edge 26 of the retractable screen 16. The expandable base 28 can be part of a container portion 72 that is selectively connected with and detached from the screen portion 70. In this manner, the container portion 72 of the handle assembly 24 can be removed from the remainder of the tonneau cover 10 to define a portable thermal storage container 74 that can be removed from the vehicle 14. Accordingly, the expandable base 28, which is part of the expandable container 36 and the container portion 72 of the handle assembly 24, is selectively removable from the screen portion 70 of the handle assembly 24.

Referring again to FIGS. 1-10, a screen portion 70 of the handle assembly 24 includes the retaining structure 58 that is adapted to be received within a portion of the cover receptacle 50 to define the extended position 20. Typically, the cover receptacle 50 is defined within an interior panel 80 of the vehicle 14 to define the extended position 20. Where the screen portion 70 includes the retaining structure 58, the container portion 72 of the handle assembly 24 can be removed from the remainder of the handle assembly 24 so that the retractable screen 16 can be maintained in the extended position 20 within the outer portion 56 of the cover receptacle 50 after removal of the container portion 72 of the handle assembly 24 from the tonneau cover 10.

It is contemplated that the expandable container 36 can include a thermally insulating layer 90 that surrounds the storage volume 34. Accordingly, the expandable container 36 can define a thermally insulated expandable container 36 for preventing thermal transfer of heat through the outer walls 92 of the expandable container 36. Additionally, the expandable base 28 that defines at least a portion of the expandable container 36 can include at least one operable flap 94 that is operable between open and closed positions 96, 98 to define selective access to the storage volume 34. It is contemplated that this operable flap 94 may also be defined within the container portion 72 of the handle assembly 24 such that the operable flap 94 is disposed at a top portion 100 of the expandable container 36. It is also contemplated that the operable flap 94 can be defined within one or more of the outer walls 92, typically the front wall 102, of the expandable container 36. In such an embodiment, the operable flap 94 is in the form of a flexible panel member 104 that can be open and closed to provide access to the interior storage volume 34 of the collapsible and expandable container 36.

Referring again to FIGS. 1-3, the tonneau cover 10 can include the retractable screen 16 that is biased toward the retracted position 22 by a rotational biasing mechanism 110 located within the housing 18. In this manner, the handle assembly 24, being attached to the retractable screen 16, can be extended and retracted as necessary to cover and reveal portions of the rear cargo area 12. Additionally, when the container portion 72 of the handle assembly 24 is removed, the screen portion 70 of the handle assembly 24 remains attached to the retractable screen 16. Additionally, the screen portion 70 of the handle assembly 24 typically includes the retaining structure 58 that selectively engages the outer portion 56 of the cover receptacle 50 for selectively maintaining the retractable screen 16 in the extended position 20.

Referring again to FIGS. 2-9, for operating the expandable container 36 between the collapsed and expanded positions 30, 32, the expandable container 36 can include a single release mechanism 120 that allows for a single expansion of the expandable container 36 from the collapsed position 30 into the expanded position 32. In various aspects of the device, it is contemplated that the expandable container 36 can include a progressively operable expansion device 122. In such an embodiment, the progressively operable expansion device 122 is selectively operable to define the collapsed position 30 where the expandable base 28 is positioned proximate the container portion 72 of the handle assembly 24, the expanded position 32 where the expandable base 28 is fully expanded away from the container portion 72 of the handle assembly 24, and a plurality of partially-expanded positions 124 of the expandable container 36. For defining the partially-expanded positions 124 of the expandable container 36, the progressively operable expansion device 122 can also include several fastening mechanisms 126 that can be progressively engaged and disengaged for moving the expandable base 28 various distances from the container portion 72 of the handle assembly 24. Examples of the progressively operable expansion device 122 can include, but are not limited to, a plurality of zippers, buttons, hook-and-loop fasteners, snaps, hasps, clasps, magnets 154, and other similar selectively engageable fastening mechanisms 126 that can be used to vary the distance of the expandable base 28 from the container portion 72 of the handle assembly 24. The progressively operable expansion device 122 can be used to define the size of the interior storage volume 34 of the collapsible container 218 to substantially match the items being stored therein and to minimize the amount of unutilized space that may affect the thermal capabilities of the collapsible container 218.

Referring again to FIGS. 8 and 9, it is contemplated that the progressively operable expansion device 122 can include a single continuous spiral-type zipper 140 that extends around the outer walls 92 of the expandable container 36. In such an embodiment, the spiral-type zipper 140 can be progressively unzipped to reveal a plurality of pleated portions 142 that can be expanded downwardly to define the various partially-expanded positions 124 as well as the fully expanded position 32 of the expandable container 36. This spiral-type zipper 140 can then be re-zipped and the pleated portions 142 folded under the spiral-type zipper 140 for moving the expandable container 36 back toward the collapsed position 30.

Referring again to FIGS. 1-10, it is contemplated that the expandable base 28 of the expandable container 36 can include various fastening mechanisms 126 that help to secure the expandable base 28 with respect to the rear cargo area 12 when the expandable container 36 is in the expanded position 32 or any one of the partially-expanded positions 124 and the container portion 72 of the handle assembly 24 is coupled with the screen portion 70 of the handle assembly 24. Such a configuration may typically be seen where the vehicle 14 is in use and movement of the vehicle 14 may result in shifting, swinging, or other movement of the expandable container 36 during use of the vehicle 14. To assist in maintaining the position of the expandable base 28 with respect to the rear cargo area 12, the expandable base 28 can include various base fasteners 150 that selectively engage the sidewall 152 of the rear storage area to retain the expandable container 36 in the expanded position 32 or any of the partially-expanded positions 124 when the container portion 72 is coupled to the screen portion 70. Such base fasteners 150 can include, but are not limited to, magnets 154 defined within the expandable base 28 that are adapted to engage magnets 154 of opposing polarity that are disposed within the sidewall 152 of the vehicle 14. These magnets 154 can thereby define a concealed securing mechanism of the expandable base 28 during operation of the vehicle 14. Such base fasteners 150 can also include straps 220, snaps, hasps, clasps, hook-and-loop fasteners, and other similar fastening mechanisms 126 that can be used to secure the expandable base 28 to the sidewall 152 of the rear storage area of the vehicle 14. The base fastener 150 can also be used to engage a cooperating fastener 156 defined within a container portion 72 of the handle assembly 24 to maintain engagement of the expandable base 28 with the container portion 72 when the expandable base 28 is in the collapsed position 30. Accordingly, the base fastener 150 is adapted to selectively engage the container portion 72 of the handle assembly 24 in the collapsed position 30 to selectively retain the expandable base 28 in the collapsed position 30.

Referring again to FIGS. 1-10, to secure the container portion 72 of the handle assembly 24 to the screen portion 70 of the handle assembly 24, various handle fasteners 170 can be included that define a mating engagement between the container portion 72 and the screen portion 70. In at least one aspect of the device, the container portion 72 and the screen portion 70 can define a sliding engagement between one or more keyhole slots 172 and corresponding protrusions, such as retaining studs 174, that slidably engage corresponding keyhole slots 172. Other corresponding mechanisms can include hook-and-loop fasteners, straps 220, hasps, clasps, snaps, and other various mechanisms.

Figure 5:
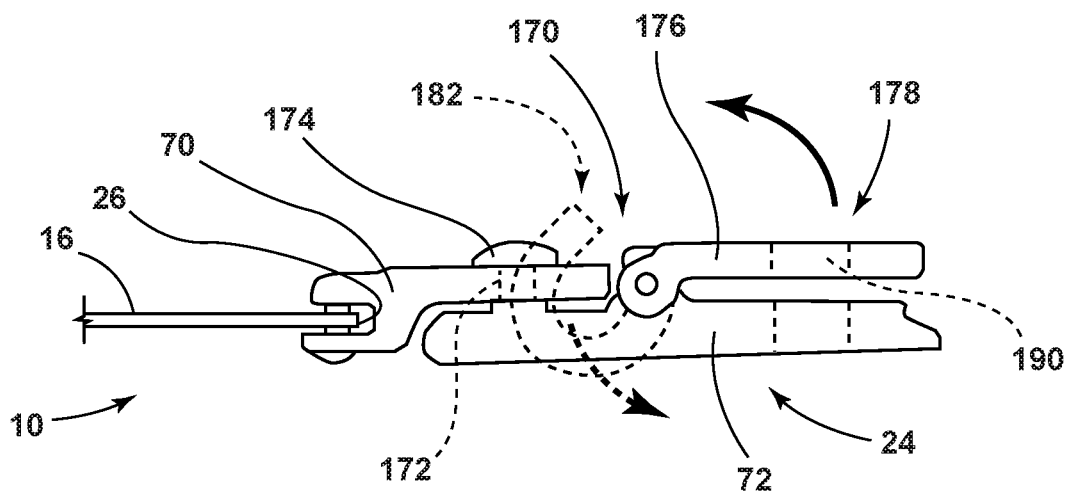
FIG. 5 is a side perspective view of an aspect of a handle assembly for the convertible tonneau cover and showing an operable handle in the stowed position.
Figure 6:
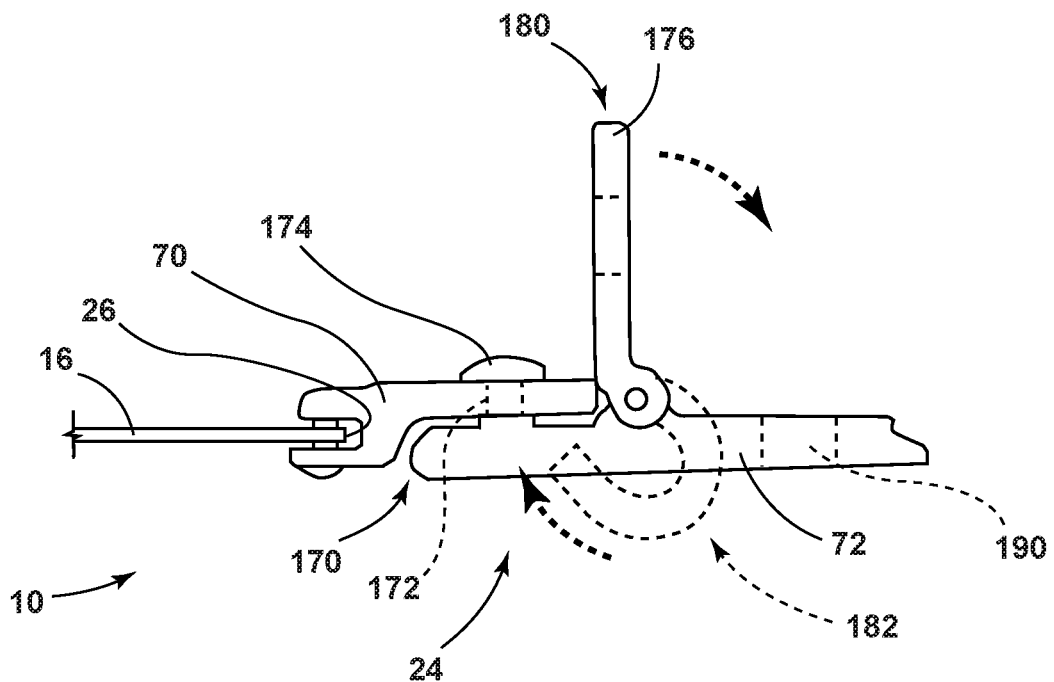
FIG. 6 is a side elevational view of the handle assembly of FIG. 5 and showing the operable handle in a use position.
Figure 7:
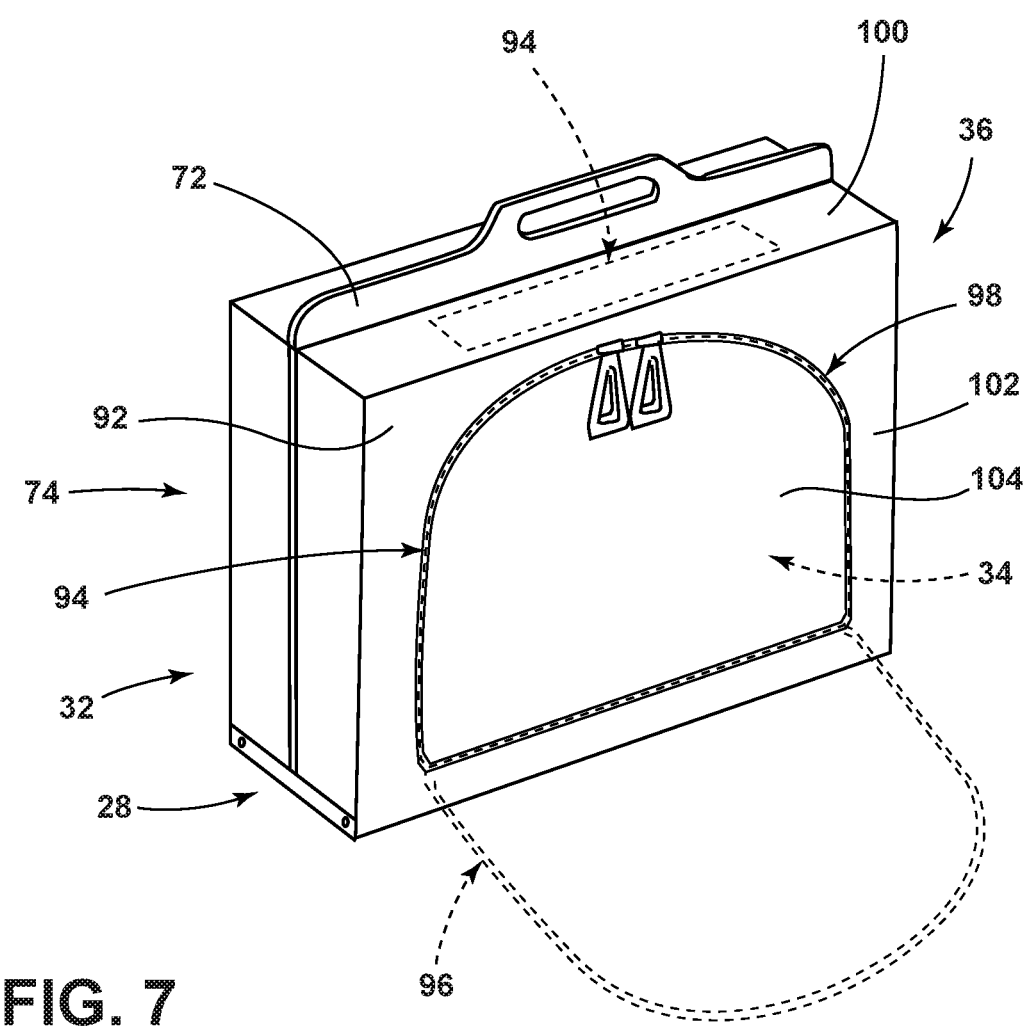
FIG. 7 is a side perspective view of an aspect of the expandable container that can be attached to the handle assembly of the convertible tonneau cover.

In various aspects of the device, as exemplified in FIGS. 5 and 6, the container portion 72 of the handle assembly 24 can include an operable handle 176 that is rotationally operable between a stowed position 178 against the remainder of the container portion 72 and a use position 180 where the operable handle 176 is generally perpendicular to the remainder of the container portion 72. The container portion 72 of the handle assembly 24 can include an operable latch mechanism 182 that is coupled to the operable handle 176. In such an embodiment, when the operable handle 176 is in the stowed position 178, the latch mechanism 182 can be rotated into engagement with the screen portion 70 to retain the screen portion 70 and the container portion 72 together. When the operable handle 176 is moved to the use position 180, the latch mechanism 182 is rotated out of engagement with the screen portion 70 of the handle assembly 24. In this disengaged use position 180, the container portion 72 can be removed from the screen portion 70 for use outside of the vehicle 14. It is contemplated that the latch mechanism 182 can be used in conjunction with various other fasteners described herein for supplementing the engagement between the container portion 72 and the screen portion 70 of the handle assembly 24. Accordingly, operation of the operable handle 176 to the stowed position 178 activates the latch mechanism 182 to couple the screen and container portions 70, 72 together. Conversely, operation of the operable handle 176 to the use position 180 serves to deactivate the latch mechanism 182 to allow for selective separation of the container portion 72 from the screen portion 70.

Referring again to FIGS. 1-10, according to various aspects of the device, the container portion 72 of handle assembly 24 can include at least a portion of the retaining structure 58 that is selectively disposed within the outer portion 56 of the cover receptacle 50. In this manner, the outer portion 56 of the cover receptacle 50 can at least partially hold the container portion 72 of the handle assembly 24 in a fixed position when the retractable screen 16 is in the extended position 20. It is also contemplated that the screen portion 70 of the handle assembly 24 can include the entire retaining structure 58 that engages the outer portion 56 of the cover receptacle 50. In such an embodiment, the container portion 72 of the handle assembly 24 may be supported by the screen portion 70 of the handle assembly 24. Typically, each of the container portion 72 and the screen portion 70 will be supported by the cover receptacle 50 when the retractable screen 16 is in the extended position 20 and the collapsible container 218 is coupled with the screen portion 70 of the handle assembly 24.

According to various aspects of the device, the container portion 72 of the handle assembly 24 can include various grasping apertures 190 for manipulating the handle assembly 24 and the retractable screen 16 between the extended and retracted positions 20, 22. The multiple grasping apertures 190 can be included within each of the screen portion 70 and the container portion 72 to allow for access to a grasping aperture 190 when the container portion 72 is attached to the screen portion 70 and also when the container portion 72 is removed from the screen portion 70.

Figure 8:
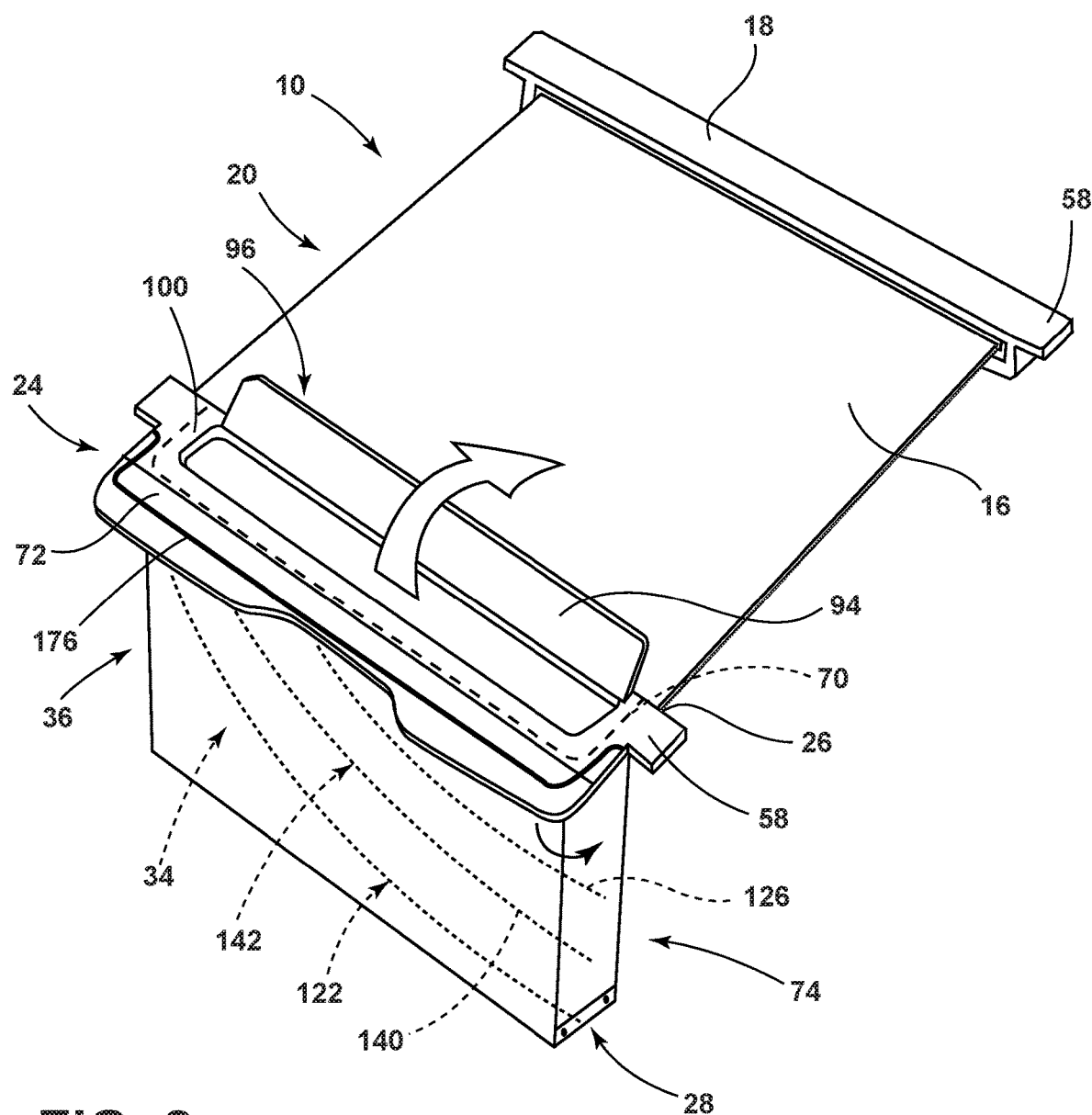
FIG. 8 is a top perspective view of an aspect of the convertible tonneau cover showing operation of an operable flap between open and closed positions.
Figure 9:
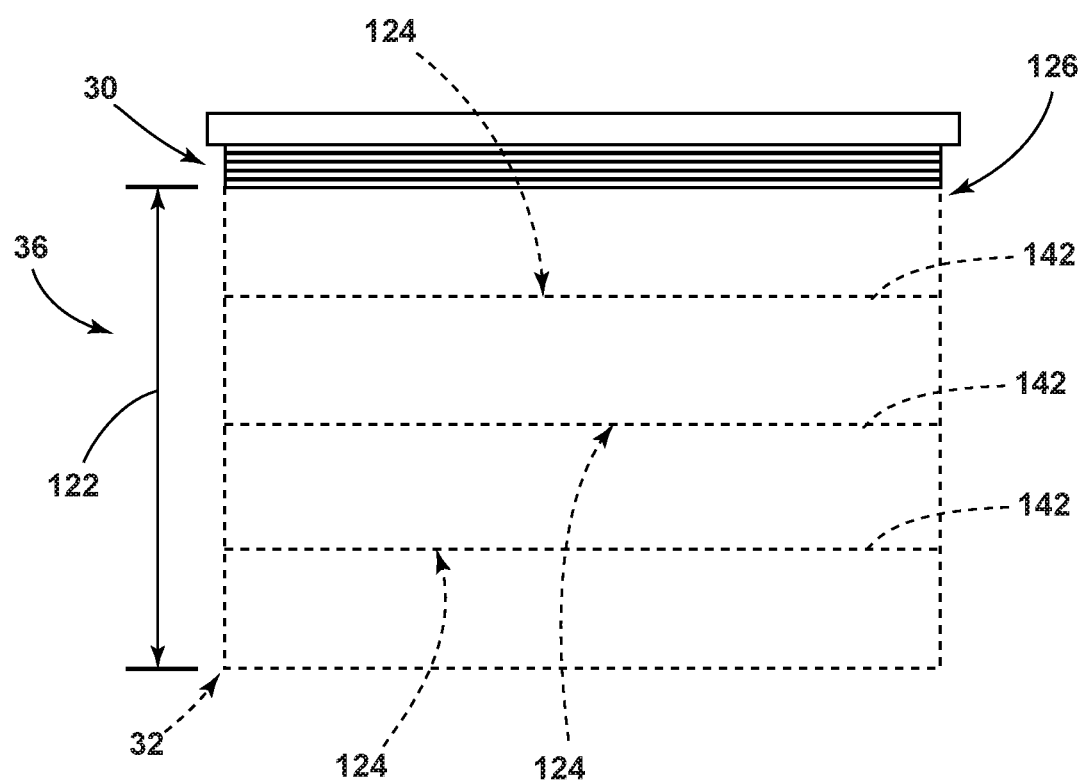
FIG. 9 is a schematic diagram illustrating expansion of the collapsible container from the collapsed position to the expanded position using an aspect of the progressively operable expansion device.
Figure 10:
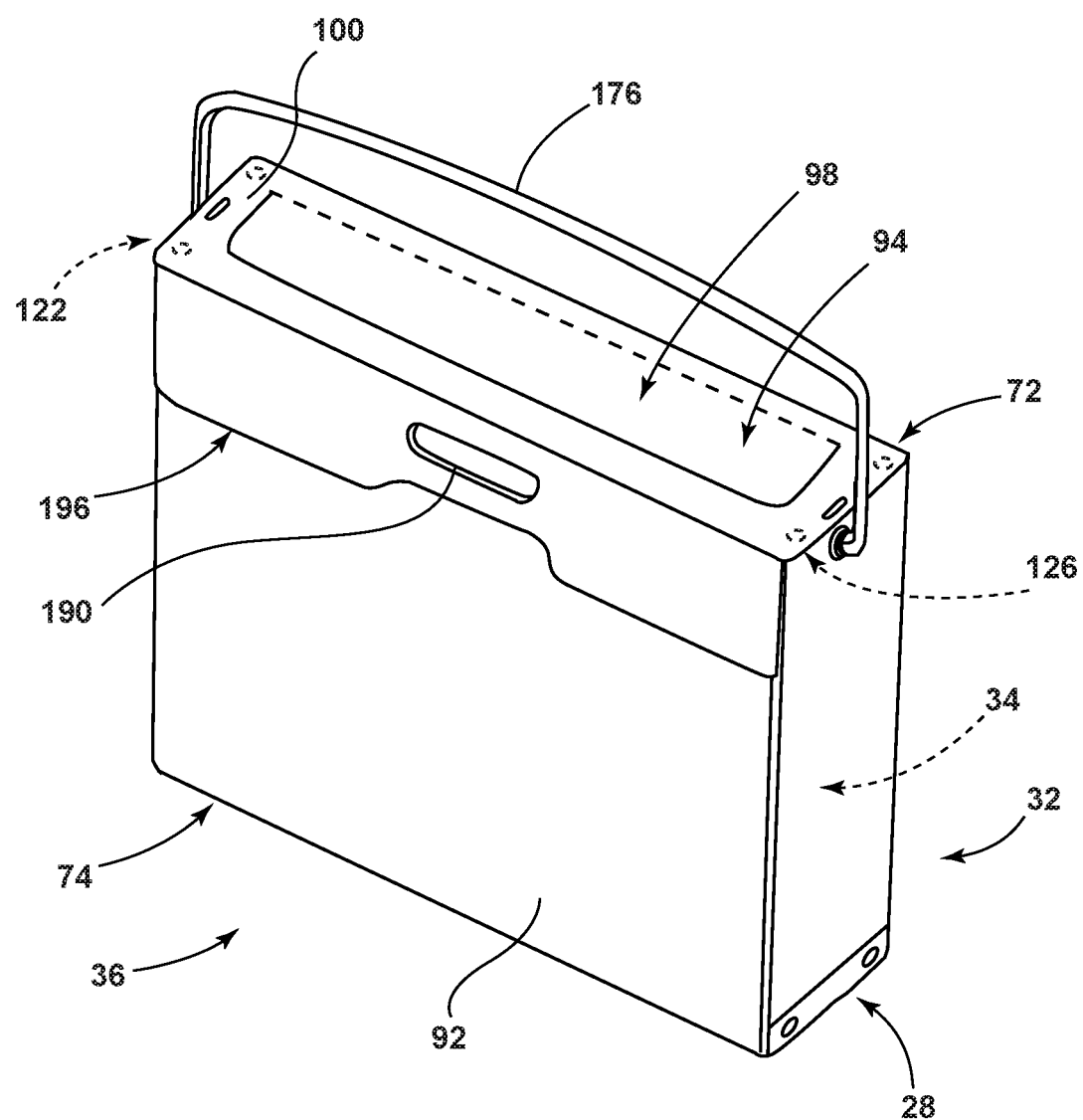
FIG. 10 is a top perspective view of the expandable container of FIG. 8 shown separated from the tonneau cover and the operable flap in the closed position.
Figure 11:
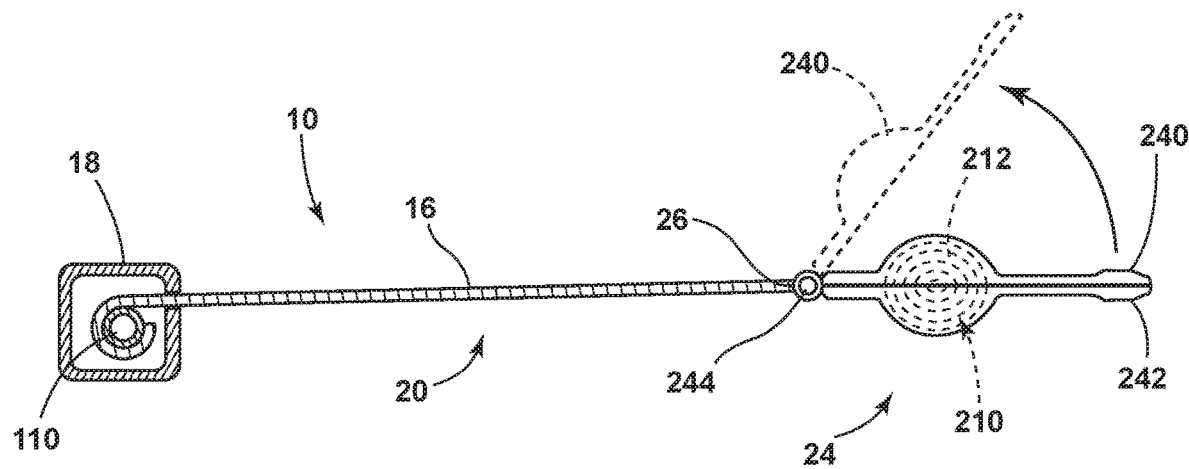
FIG. 11 is a cross-sectional view of an alternative aspect of the convertible tonneau cover.
Figure 12:
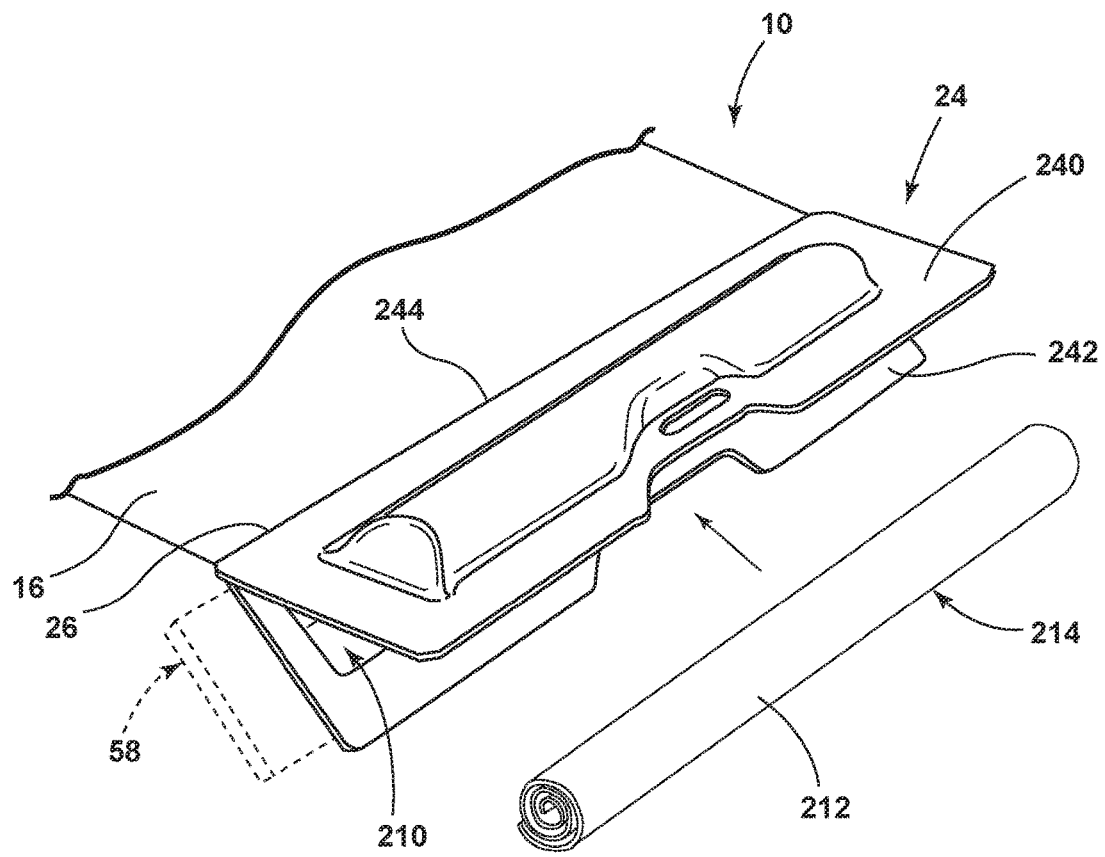
FIG. 12 is a top perspective view of an aspect of the handle assembly of the tonneau cover of FIG. 11 and showing a collapsible fabric member in a folded position.

Referring now to FIGS. 8-10, it is contemplated that the container portion 72 of the handle assembly 24 can include various folding portions 196. Such folding portions 196 can include a grasping aperture 190 for manipulating the handle assembly 24 and the retractable screen 16 between the extended and retracted positions 20, 22. The folding portions 196 can also include a separate operable handle 176 that can be moved between stowed and use positions 178, 180 for manipulating the expandable container 36 as needed.

Referring now to FIGS. 11-14, the tonneau cover 10 can include a handle assembly 24 that is coupled to an outer edge 26 of the retractable screen 16. In such an embodiment, the handle assembly 24 can include a fabric stowing area 210. A collapsible fabric member 212 that is operable between a folded position 214 and an unfurled position 216 can be selectively stowed within the fabric stowing area 210. The collapsible fabric member 212 in the folded position 214 is defined by the fabric member 212 being rolled, folded, or otherwise manipulated into a compact shape such that it can be stowed within the fabric stowing area 210 of the handle assembly 24. The collapsible fabric member 212 can also be manipulated to the unfurled position 216. In the unfurled position 216, the collapsible fabric member 212 defines a collapsible container 218 that can be positioned below the retractable screen 16.

Referring again to FIGS. 11-14, according to various aspects of the device, the collapsible fabric member 212 can include a plurality of straps 220 that are adapted to engage corresponding attachment features 222 (shown in FIG. 1) defined within a portion of the rear cargo area 12 of the vehicle 14 to assist in defining the collapsible container 218 in a container position 224. It is contemplated that the plurality of straps 220 can be defined by fabric loops 226 that extend from an upper edge 228 of the collapsible container 218. Accordingly, in the container position 224, the collapsible fabric member 212 is engaged with the corresponding attachment features 222 of the rear cargo area 12. The retractable screen 16 can be operated between the extended and retracted positions 20, 22 to define an operable lid 230 of the collapsible fabric member 212 while in the container position 224. Additionally, the collapsible fabric member 212 can include a thermally insulating layer 90 or thermally insulating member. In this manner, the collapsible fabric member 212 in the container position 224 can define a thermally insulated storage volume 34 within the rear cargo area 12 of the vehicle 14.

Referring again to FIGS. 11 and 12, the handle assembly 24 can include upper and lower handles 242 that are rotationally operable relative to one another to define a fabric stowing area 210. In this manner, the upper and lower handles 240, 242 can be open to selectively receive the collapsible fabric member 212 in the folded position 214. It is contemplated that the upper and lower handles 240, 242 can include a clamshell mechanism that operate about a hinge 244 that is disposed proximate the outer edge 26 of the retractable screen 16. In various aspects of the device, the lower handle 242 of the handle assembly 24 may typically include the retaining structure 58 that engages the outer portion 56 of the cover receptacle 50 within the rear storage area of the vehicle 14. In such a configuration, the lower handle 242 can be engaged within the cover receptacle 50 and the upper handle 240 can be rotated to allow access to the fabric stowing area 210 for accessing and removing the collapsible fabric member 212 in the folded position 214. According to various aspects of the device, the upper handle 240 of the handle assembly 24 may also include the retaining structure 58 for engaging the cover receptacle 50.

Figure 13:
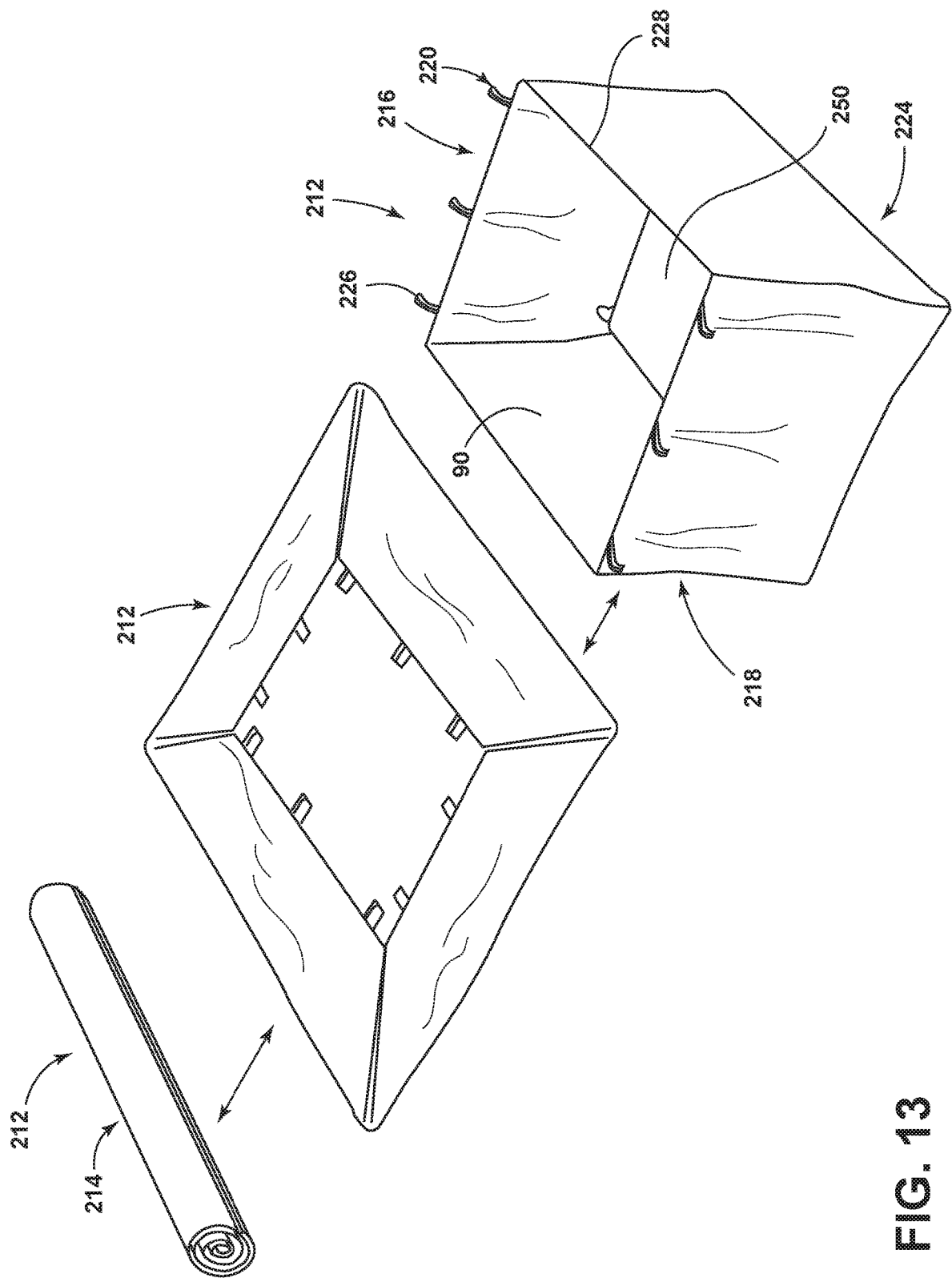
FIG. 13 is a schematic diagram illustrating operation of the collapsible fabric member between the folded position and the unfurled position.
Figure 14:
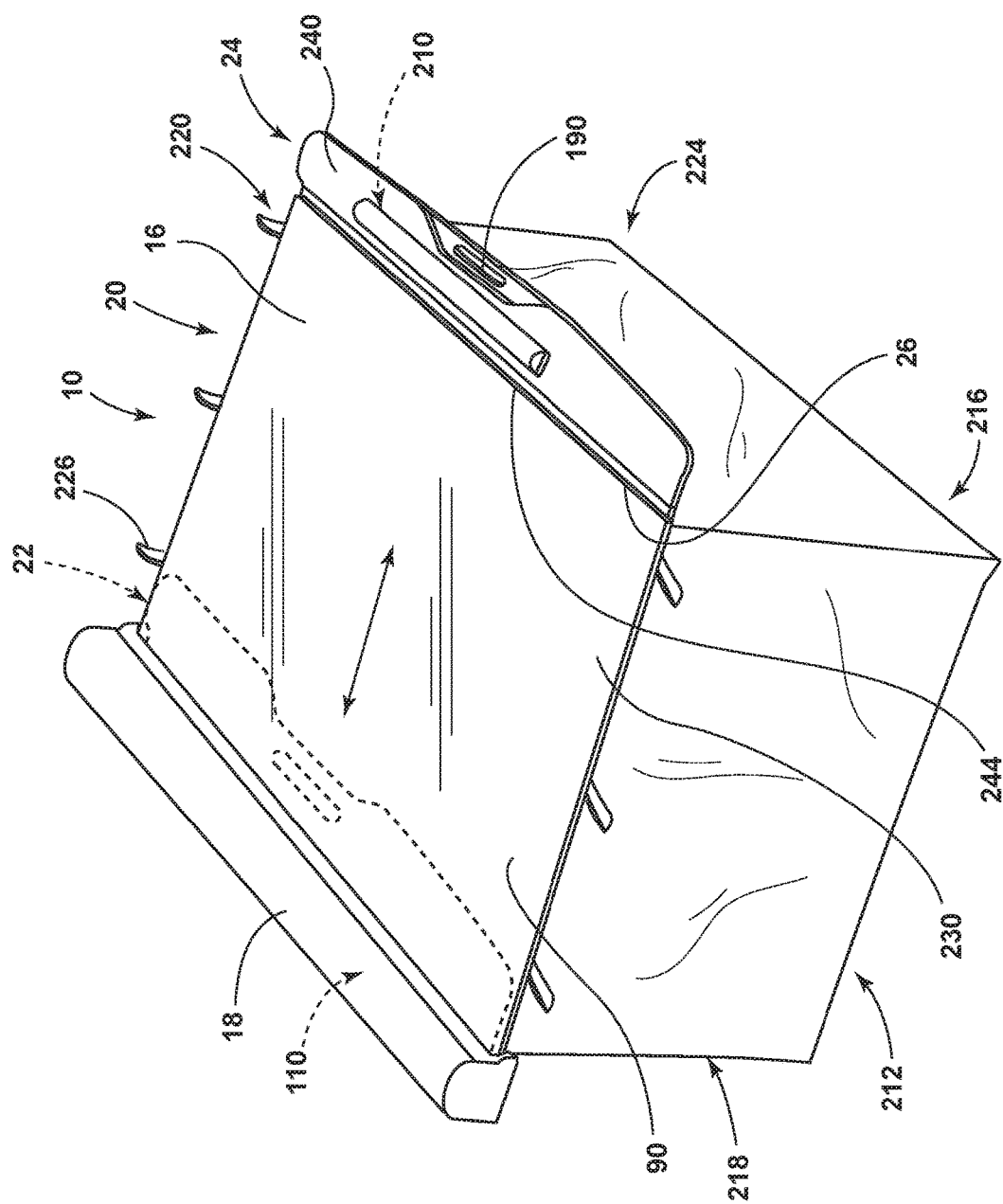
FIG. 14 is a top perspective view of the tonneau cover of FIG. 11 and showing the collapsible fabric member as a collapsible container shown positioned below the retractable screen of the tonneau cover.

Referring now to FIGS. 13 and 14, the collapsible fabric member 212 can be folded and/or rolled into a compact shape to define the folded position 214 that can be stowed within the fabric stowing area 210 of the handle assembly 24. The collapsible fabric member 212 can be unrolled and/or unfolded to expose the plurality of straps 220 that extend from the upper edge 228 of the collapsible container 218. These plurality of straps 220 can then be coupled with mating attachment features 222 disposed within the sidewall 152 of the storage area of the vehicle 14. In this manner, the collapsible fabric member 212 in a container position 224 can be hung from portions of the sidewall 152 of the rear storage area of the vehicle 14. The retractable screen 16 can then be extended and retracted to define the operable lid 230 for the collapsible container 218. Accordingly, the collapsible container 218 may be substantially free of structural reinforcement such that the entire collapsible container 218 can be rolled and/or folded to define the folded position 214 of the collapsible fabric member 212. A bottom portion 250 of the collapsible fabric member 212 may include various base fasteners 150 that can be used to secure the base fastener 150 of the collapsible fabric member 212 within the rear cargo area 12 of the vehicle 14. Such base fasteners 150 within the collapsible fabric member 212 may be engaged to sidewalls 152 of the rear storage area or the floor 252 of the rear cargo area 12 or the floor 252 (shown in FIG. 1) of the rear cargo area 12 to substantially secure the collapsible fabric member 212 in the container position 224.

Figure 15:
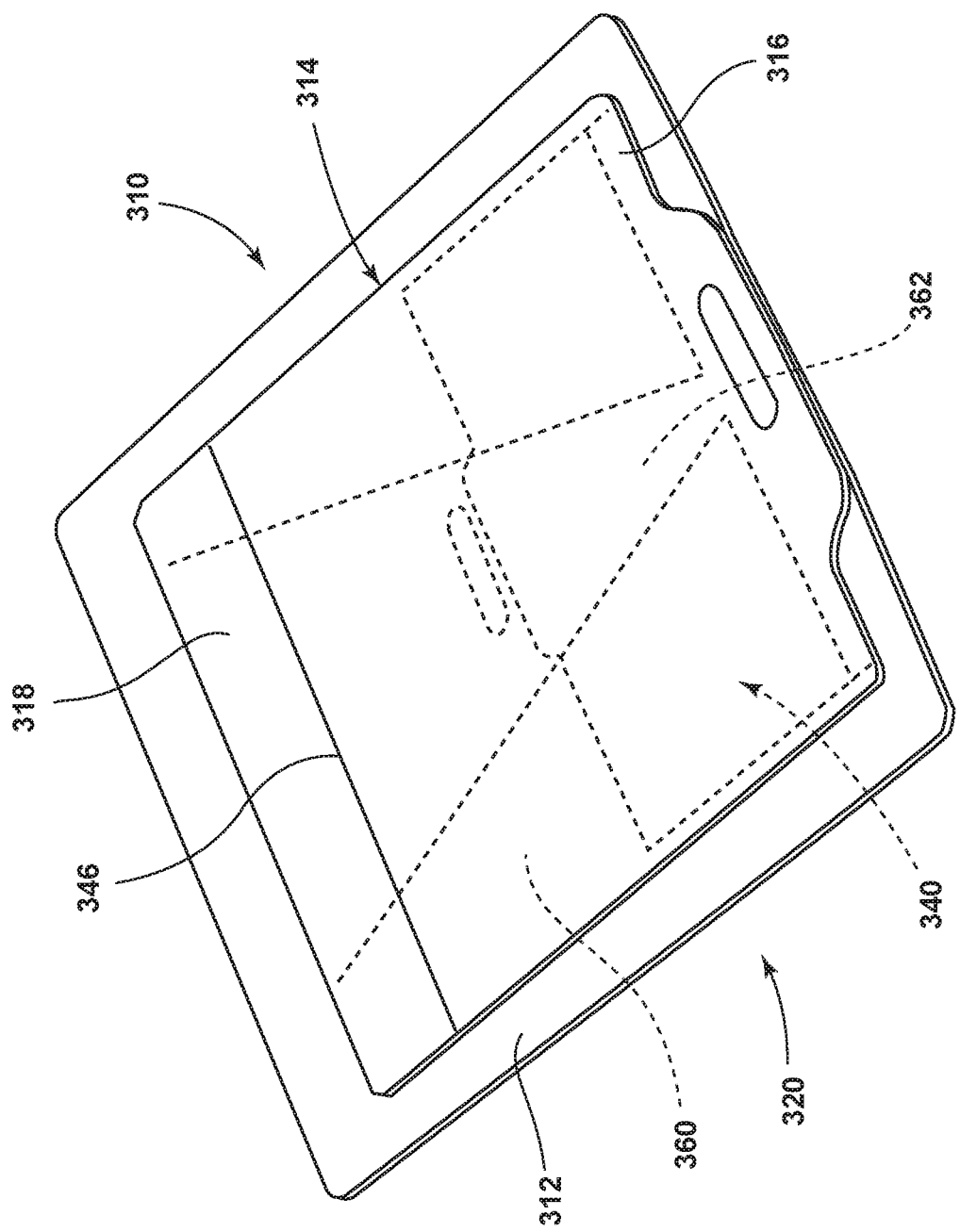
FIG. 15 is a top perspective view of a convertible load floor shown in a folded position.
Figure 16:
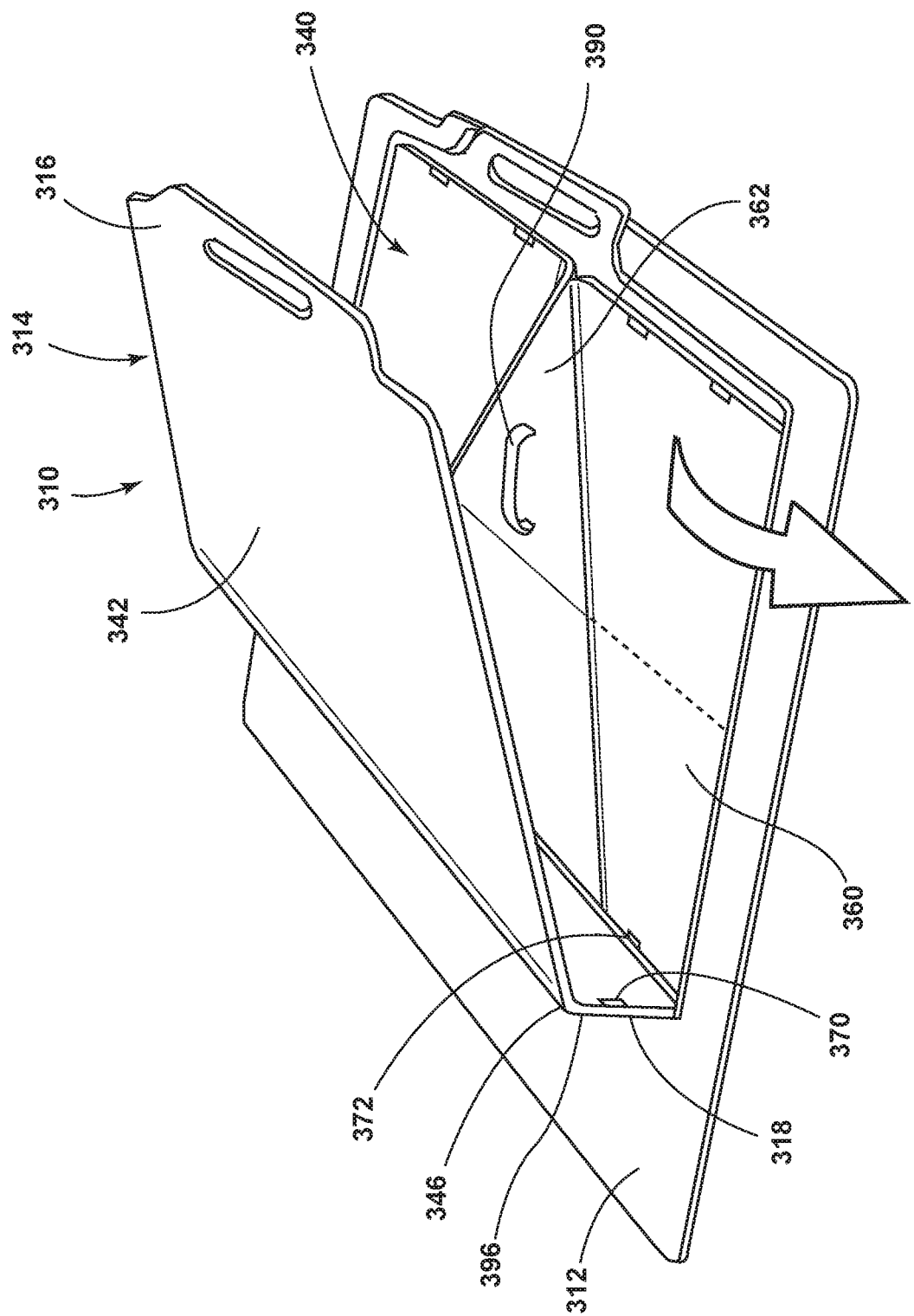
FIG. 16 is a top perspective view of the convertible load floor of FIG. 15, being moved into a container position.
Figure 17:
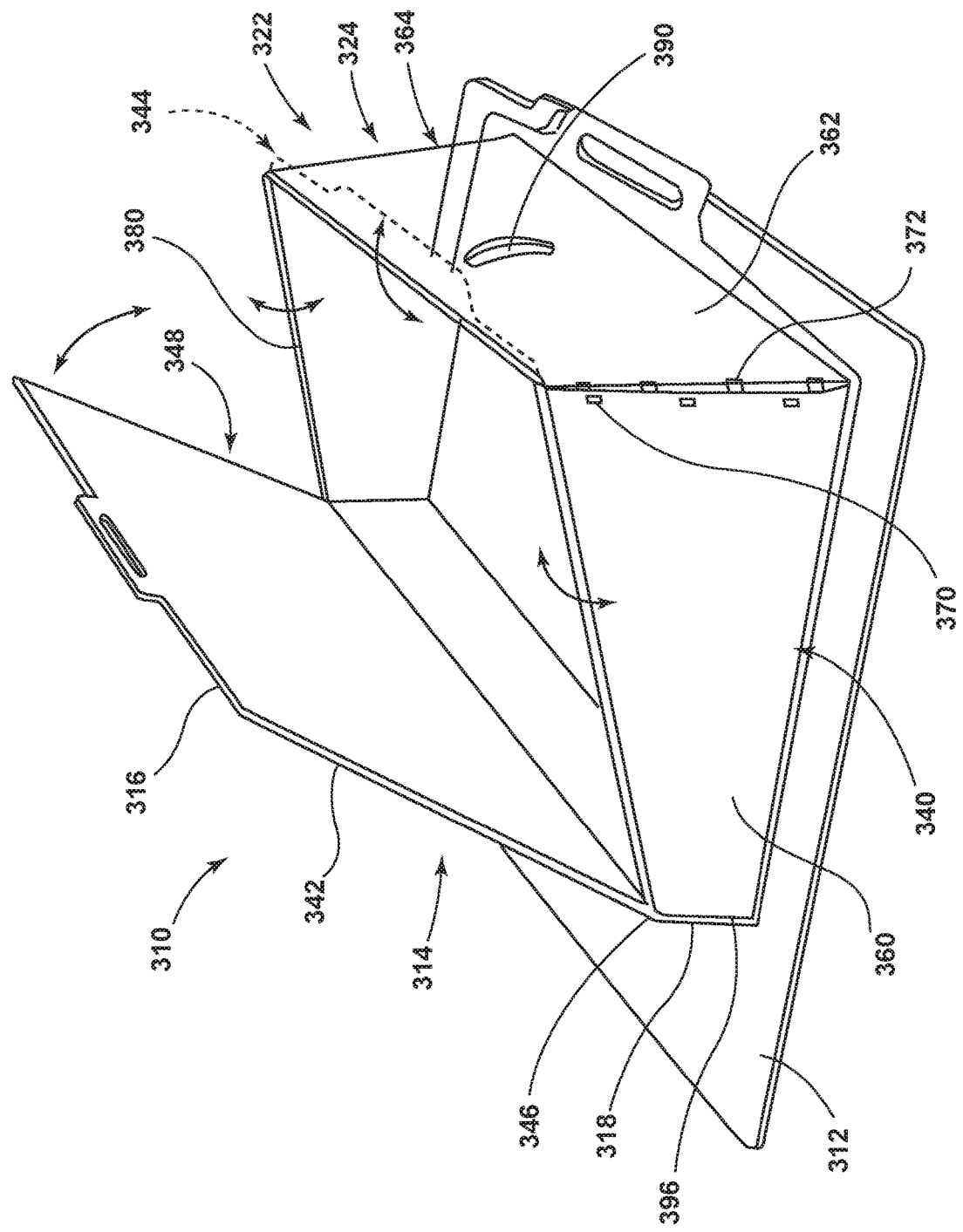
FIG. 17 is a top perspective view of the convertible load floor of FIG. 16 showing the convertible load floor in the container position.

Referring now to FIGS. 15-17, the collapsible container 218 for the rear cargo area 12 of the vehicle 14 can also include a convertible load floor 310 for a rear cargo area 12 of a vehicle 14. The convertible load floor 310 can define at least a portion of the floor 252 of the rear cargo area 12 and can include a lower panel 312 and an upper panel 314 having a handle portion 316 and a hinge portion 318. The hinge portion 318 of the upper panel 314 can be adapted to hingedly engage the lower panel 312 at a hinge, such as living hinge 346, piano hinge, or other hinged mechanism. According to various aspects of the device, the operable upper panel 314 can be operable between a folded state 320 where the operable upper panel 314 is substantially flat against the lower panel 312 and a container state 322 where the operable upper panel 314 at least partially defines a storage basket 324 of the convertible load floor 310.

Referring again to FIGS. 15-17, folding flaps 340 serve to further define the folded state 320 and the container state 322. In the folded state 320, the folding flaps 340 are laid substantially flat between the upper panel 314 and the lower panel 312 and are substantially concealed therebetween. In the container state 322, which is defined by the hinge portion 318, folding flaps 340 and the lower panel 312 being formed into the shape of the storage basket 324. The handle portion 316, in turn, defines a lid 342 of the storage container 74. In this manner, the handle portion 316 of the upper panel 314 selectively engages the folding flaps 340 to define a closed state 344 of the storage basket 324. The handle portion 316 is hingedly coupled with the hinge portion 318 and rotates about a hinged attachment, such as a living hinge 346 or piano hinge, defined between the hinge portion 318 and the handle portion 316 to define the open and closed states 348, 344 of the storage container 74 of the convertible load floor 310.

Referring again to FIGS. 15-17, it is contemplated that the folding flaps 340 can be hingedly coupled with the lower panel 312. As the folding flaps 340 rotate between the folded state 320 and the container state 322, the folding flaps 340 can be at least partially engaged with one another. It is also contemplated that the folding flaps 340 can be selectively secured to one another in the container state 322 and then folded, independently from one another, into the folded state 320. The various folding flaps 340 can typically include opposing lateral flaps 360 and a central flap 362. The central flap 362, in the container state 322, defines a front wall 364 of the storage basket 324 that may be accessible through the rear door (shown in FIG. 1) or trunk hatch of the rear cargo area 12 of the vehicle 14. The opposing lateral flaps 360 are typically positioned proximate the sidewalls 152 of the rear cargo area 12. In various aspects of the device, the folding flaps 340 can be connected together via living hinges 346. In such an embodiment, the folding flaps 340 are moved between the folded state 320 and the container state 322, movement of one of the folding flaps 340 at least partially manipulates the remaining folding flaps 340 in the same general direction.

Referring again to FIGS. 15-17, it is contemplated that the folding flaps 340 are each substantially rigid members that are coupled together in the container state 322 by retaining tabs 370 that engage corresponding retaining recesses 372 of the folding flaps 340. In such an embodiment, the folding flaps 340 can be substantially independently operable members that can be moved relative to one another to define the folded and container states 320, 322. Additionally, it is contemplated that the lower panel 312 of the convertible load floor 310 can define at least a portion of the floor 252 of the rear cargo area 12 of the vehicle 14. Alternatively, the lower panel 312 of the convertible load floor 310 can be a separate member that is placed on top of the floor 252 of the rear cargo area 12 of the vehicle 14. In such an embodiment, the lower panel 312 is at least partially secured to the floor 252 of the rear cargo area 12 by various base fasteners 150 similar to those described herein.

Referring again to FIGS. 15-17, the handle portion 316 of the upper panel 314 can be selectively coupled to a top edge 380 of the folding flaps 340 to define the closed state 344 of the storage container 74. In such an embodiment, the handle portion 316 can be disengaged from the top edge 380 and rotated upward relative to the hinge portion 318 to define the open state 348 of the storage container 74. Additionally, the lower panel 312, the upper panel 314 and the plurality of the folding flaps 340 can each include a thermally insulating layer 90 that defines the thermal capabilities of the storage container 74.

Referring again to FIGS. 15-17, it is contemplated that the various folding flaps 340 can include grasping features 390 that can be accessed and manipulated for moving the folding flaps 340 from the folded state 320 to the container state 322. As exemplified in the figures, the central flap 362 of the folding flaps 340 may be the only one of the folding flaps 340 that includes the grasping feature 390. The central flap 362 in the folded state 320 may also be located underneath each of the opposing lateral flaps 360. In this manner, as the user manipulates the grasping feature 390 and moves the central flap 362 toward the container state 322, the central flap 362 tends to bias the opposing lateral flaps 360 toward the container state 322 as well. As the central flap 362 slidably engages the opposing lateral flaps 360, the retaining tabs 370 and retaining recesses 372 of the folding flaps 340 can engage one another once the central flap 362 reaches the container state 322. Accordingly, movement of the central flap 362 toward the container state 322 similarly manipulates the opposing lateral flaps 360 toward the container state 322. When disengaging the folding flaps 340 from the container state 322 and moving the folding flaps 340 back to the folded state 320, the central flap 362 can be pushed forward and moved downward to the folded state 320 such that the opposing lateral flaps 360 can fold on top of the central flap 362. According to various aspects of the device, one or more of the folding flaps 340 can include a biasing mechanism that tends to bias one or more of the folding flaps 340 toward the folded state 320. In such an embodiment, disengagement of the folding flaps 340 from one another can tend to result in the folding flaps 340 being biased back toward the folded state 320.

Referring again to FIGS. 15-17, as the operable upper member is moved toward the container state 322, the hinge portion 318 rotates upward relative to the lower panel 312 to define a rear wall 396 of the storage container 74. The folding flaps 340 can then be moved upward from the folded state 320 to the container state 322. As the folding flaps 340 are moved to the container state 322, the opposing lateral flaps 360 can define retaining tabs 370 and retaining recesses 372 that serve to define the container state 322 between the opposing lateral flaps 360 and the hinge portion 318 of the upper panel 314 in the container position 224. Once the folding flaps 340 and the hinge portion 318 of the upper panel 314 are in the container state 322, various fasteners can secure the hinge portion 318 and the folding flaps 340 in the container state 322 until such time as the user desires to move the convertible load floor 310 back to the folded state 320.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A tonneau cover for a vehicle storage area, the tonneau cover comprising:
    a retractable screen that extends from a housing to define extended and retracted positions; and
    a handle assembly coupled to an outer edge of the retractable screen and having an expandable base that defines a collapsed position proximate the retractable screen and an expanded position that defines a storage volume, wherein the handle assembly comprises:
        a screen portion that is coupled to the retractable screen; and
        a container portion that is coupled to an outer edge of the screen portion and includes the expandable base, wherein the container portion and the expandable base are selectively removable from the screen portion, and wherein the container portion has a width that is the same as a width of the retractable screen.

2. The tonneau cover of claim 1, wherein the expandable base includes a thermally insulating layer that surrounds the storage volume.

3. The tonneau cover of claim 1, wherein the screen portion of the handle assembly includes a retaining structure, and wherein the retaining structure is configured to selectively attach with a cover receptacle that is defined within an interior panel of a vehicle, and wherein engagement of the retaining structure with the cover receptacle defines the extended position of the retractable screen.

4. The tonneau cover of claim 1, wherein the retractable screen is biased toward the retracted position by a rotational biasing mechanism located within the housing.

5. The tonneau cover of claim 1, wherein the expandable base includes an operable flap that is operable between open and closed positions to provide selective access to the storage volume.

6. The tonneau cover of claim 5, wherein the operable flap is defined within the container portion of the handle assembly.

7. A vehicle comprising:
    a rear storage area defining a cover receptacle;
    a retractable screen selectively coupled to the cover receptacle to define a covering state of the rear storage area; and
    a handle assembly coupled to the retractable screen and having an expandable container that is selectively removable from the retractable screen, wherein the handle assembly comprises:
        a screen portion that is attached to the retractable screen, wherein the screen portion includes a retaining structure that engages the cover receptacle in the covering state; and a container portion that extends from an outer edge of the screen portion and defines the expandable container, the container portion of the handle assembly being selectively removable from the screen portion.

8. The vehicle of claim 7, wherein the expandable container is operable between expanded and collapsed positions, the expanded position defining an interior storage volume.

9. The vehicle of claim 8, wherein the retaining structure is defined within the screen portion, and wherein a width of the container portion is the same as a width of the retractable screen.

10. The vehicle of claim 9, wherein the container portion includes an operable flap that is operable to provide selective access to the interior storage volume of the expandable container.

11. The vehicle of claim 10, wherein the expandable container includes a base that extends away from the container portion of the handle assembly to define the expanded position, and wherein the base includes a fastener that selectively engages a sidewall of the rear storage area to retain the expandable container in the expanded position when the container portion is coupled to the screen portion.

12. The vehicle of claim 11, wherein the fastener selectively engages the container portion of the handle assembly in the collapsed position to selectively retain the base in the collapsed position.

13. The vehicle of claim 8, wherein the expandable container includes a progressively operable expansion device, wherein the expansion device is selectively operable to define the collapsed position, the expanded position and a plurality of partially-expanded positions of the expandable container.

14. The vehicle of claim 8, wherein the expandable container in the expanded position defines a front wall that is selectively operable to provide access to the interior storage volume.

15. The vehicle of claim 8, wherein the expandable container includes a thermally insulating layer that surrounds the interior storage volume.

16. A vehicle tonneau cover comprising:
a retractable screen that is selectively extendable from a housing;
a handle assembly that is selectively operable with the retractable screen between extended and retracted positions, the handle assembly comprising:
 a screen portion attached to the retractable screen; and
 a container portion that is selectively removable from the screen portion in either of the extended and retracted positions, wherein the container portion is selectively attached to an outer edge of the screen portion; and
an insulated container attached to the container portion and operable between a collapsed position and an extended position that defines an interior storage volume, wherein a width of the container portion is the same as a width of the retractable screen.

17. The vehicle tonneau cover of claim 16, wherein the screen portion of the handle assembly includes a retaining structure that is configured to couple with a cover receptacle of a rear storage area of a vehicle, and wherein the container portion and the insulated container are selectively removable from the screen portion while the screen portion is held in the cover receptacle.

18. The vehicle tonneau cover of claim 17, wherein the container portion is adapted to at least partially occupy the cover receptacle when the container portion is attached to the screen portion and the handle assembly is retained within the cover receptacle.

19. The vehicle tonneau cover of claim 16, wherein the container portion of the handle assembly includes a rotationally operable handle that is operable between stowed and use positions, wherein the rotationally operable handle in the stowed position activates a latch mechanism that selectively couples with the screen portion, and wherein operation of the rotationally operable handle to the use position deactivates the latch mechanism.

\* \* \* \* \*